(12) United States Patent
Monroe

(10) Patent No.: US 6,575,403 B1
(45) Date of Patent: Jun. 10, 2003

(54) PERSONNEL LIFT DEVICE WITH AUTOMATIC ASCENT AND DESCENT CONTROL

(76) Inventor: James I. Monroe, 103 Gulf Rd., Box 92, Colton, NY (US) 13625

(*) Notice: Subject to any disclaimer, the term of this patent is extended or adjusted under 35 U.S.C. 154(b) by 0 days.

(21) Appl. No.: 10/080,416

(22) Filed: Feb. 22, 2002

Related U.S. Application Data

(63) Continuation-in-part of application No. 09/542,725, filed on Apr. 4, 2000, now Pat. No. 6,360,988.

(51) Int. Cl.$^7$ ................................................ B64B 1/40
(52) U.S. Cl. ............................ 244/31; 244/33; 472/131
(58) Field of Search .................... 244/31, 33; 472/131, 472/134, 135

(56) References Cited

U.S. PATENT DOCUMENTS

| | | |
|---|---|---|
| 1,183,796 A | 5/1916 | Bumbaugh |
| 3,679,155 A | 7/1972 | Centofanti |
| 4,055,316 A | 10/1977 | Chipper et al. |
| 4,640,474 A | 2/1987 | Manseth |
| 4,995,572 A | 2/1991 | Piasecki |
| 5,080,302 A | 1/1992 | Hoke |
| 5,391,115 A | 2/1995 | Bessey |
| 5,449,130 A | 9/1995 | Huntington |
| 5,813,627 A | 9/1998 | Huntington |
| 5,967,459 A | 10/1999 | Hayashi |
| 6,325,329 B1 * | 12/2001 | Meadows .................. 244/31 |

* cited by examiner

*Primary Examiner*—J. Woodrow Eldred
(74) *Attorney, Agent, or Firm*—Greenwald & Basch LLP; Duane C. Basch

(57) ABSTRACT

The present invention is an apparatus to counter normal gravitational force in order to provide a personnel lifting device. The personnel lifting device is a lighter-than-air gas-filled balloon having a harness to suspend a user therefrom. The balloon further includes a weighted tether to automatically control the height of any ascent and the speed of any descent—wherein the balloon may be used as a component of an amusement.

15 Claims, 4 Drawing Sheets

PERSONNEL LIFT DEVICE WITH AUTOMATIC ASCENT AND DESCENT CONTROL

CROSS REFERENCE

This application is a continuation-in-part of co-pending U.S. patent application Ser. No. 09/542,725 by James I. Monroe, filed Apr. 4, 2000, now U.S. Pat. No. 6,360,988 B1 which is hereby incorporated by reference in its entirety for its teachings.

This invention relates generally to a personnel lifting device to completely counter a normal gravitational force, and more particularly to various features of a balloon, wherein the balloon apparatus is limited in the height of ascent or has controlled descent by a weighting mechanism associated with at least one tether attached to the balloon apparatus.

BACKGROUND AND SUMMARY OF THE INVENTION

The present invention is an apparatus for providing an upward lifting force to an individual(s), so as to enable the individual to partially counteract the earth's normal gravitational force, thereby allowing for a slower, controlled ascent to, or descent from, an elevated position.

One aspect of the invention is based on the observation of problems with conventional lighter-than-air flight systems is their reliance on a "pilot," a ballast and/or fuel system to control the flight. Very little control is left to the inexperienced user. Moreover, existing low-gravity jumping apparatus (e.g., Parabounce™) require fixed tethering and or have crude methods of adjusting the net lift of the apparatus with the user. Furthermore, such systems merely allow for bouncing or jumping, and do not contemplate descent from elevated positions or an ability to maneuver or control the apparatus.

This aspect is based on the discovery of a technique that alleviates these problems by providing a balloon as part of the personnel lifting device, wherein the balloon and user can automatically be limited in the height to which they ascend via weighted tethers, while preventing or controlling the impact between the user and the ground upon descent. This aspect may be achieved by incorporating one or more weighted tethers, attached to the balloon, so as to add weight as the balloon and user ascend (more tether extended increases weight due to increased length of tether being suspended), and to decrease weight as they descend.

Moreover, a system incorporating the maneuverable, controlled descent balloon may be used to provide an amusement ride or game. The techniques described herein are advantageous because they provide an efficient method of offering user-controlled lifting, wherein the apparatus may be employed as an amusement. The various efficiencies afforded by aspects of the invention enable the personnel lifting device and amusement applications to be provided in a cost-efficient manner. The techniques of the invention are advantageous because they provide a range of alternatives for use of a personnel lifting device, each of which is useful in appropriate situations. As a result of the invention, the personnel lifting device can be offered in a low cost amusement setting.

Figure 1:
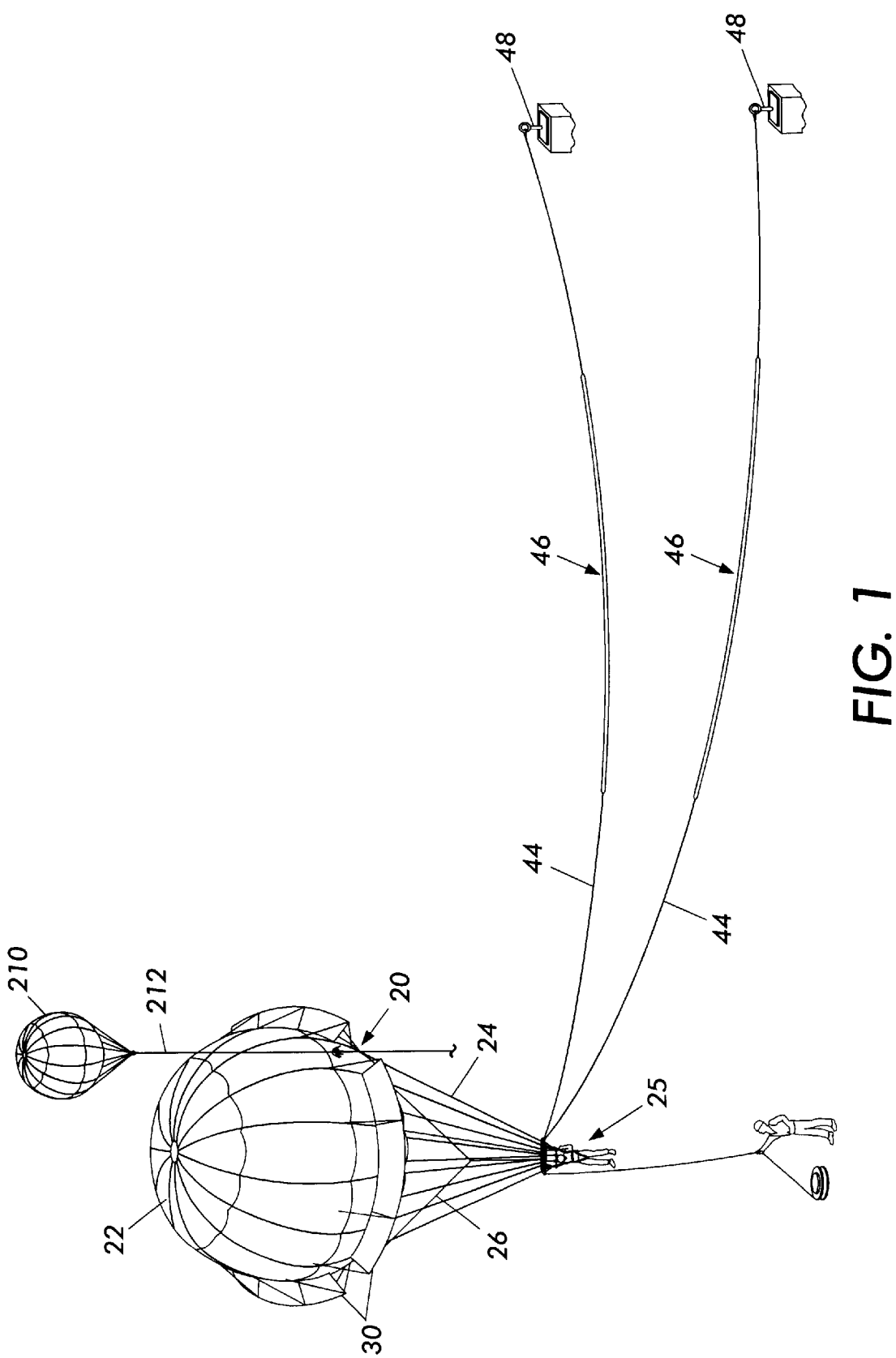
FIG. 1 illustrates a personnel lifting device in accordance with one aspect of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "balloon" is intended to represent a light-weight enclosure for a gas, where the balloon is preferably inflated with a lighter-than-air gas (e.g., helium) so as to provide a lifting force to an object attached thereto. Although not required for the present invention, the balloon may include "Paraflaps" which are aileron-like flaps that are supported by a semi-rigid frame extending from the balloon so as to control the drag of a descending balloon and user harnessed thereto.

Turning now to FIG. 1 there is shown an illustration of a personnel lifting device or balloon in accordance with one aspect of the present invention. Balloon apparatus 20 includes a balloon 22 and a support assembly 24 enclosing and/or affixed to the balloon. In a preferred embodiment, balloon 22 is constructed of a two fabric envelope, with an inner liner of a light-weight, gas impermeable fabric such as Mylar, and an outer layer of Denier ultra-violet resistant coated nylon with an integrated lattice, 5 ounce/square yard nylon gas-fabric. In normal use the balloon is inflated through a resealable opening (not shown) with a lighter-than-air gas (e.g., helium) to a pressure between 1.0 and 1.2 atmospheres, preferably about 1.003 atmospheres and is then sealed. Preferably the leakage of the gas from the balloon is minimal.

As depicted in FIG. 1, balloon 22 is spherical in shape, having a diameter of at least 18 feet and preferably 22 feet to provide sufficient lifting force to a range of adult user weights. It will be appreciated that smaller balloon sizes may be used for children or smaller adults. The support assembly is comprised of a plurality of lines (ropes or cables) 24 that encircle the balloon on one of a plurality of meridians and are fastened to a weight ring or similar harness attachment. It will be appreciated by those familiar with balloon design that various alternative shapes and sizes are possible in order to control the lift and maneuverability of the balloon, including, cylinder, ellipsoid, polyhedron, etc. The present invention further contemplates balloons made in the shape of various animals and familiar objects so as to be attractive for users and spectators alike.

In use a user 25, wearing a parachutist harness, is attached via buckles or lockable karabiners to the weight ring where the buoyant nature of the balloon will cause the user to experience a reduced or negative net gravitational weight. Balloon 20 may also include a plurality of paraflaps 30, as depicted in detail in FIG. 3, extending outward from the balloon along a circumferential arc midway between the top and bottom of the balloon to allow the user to maneuver the balloon.

Figure 2:
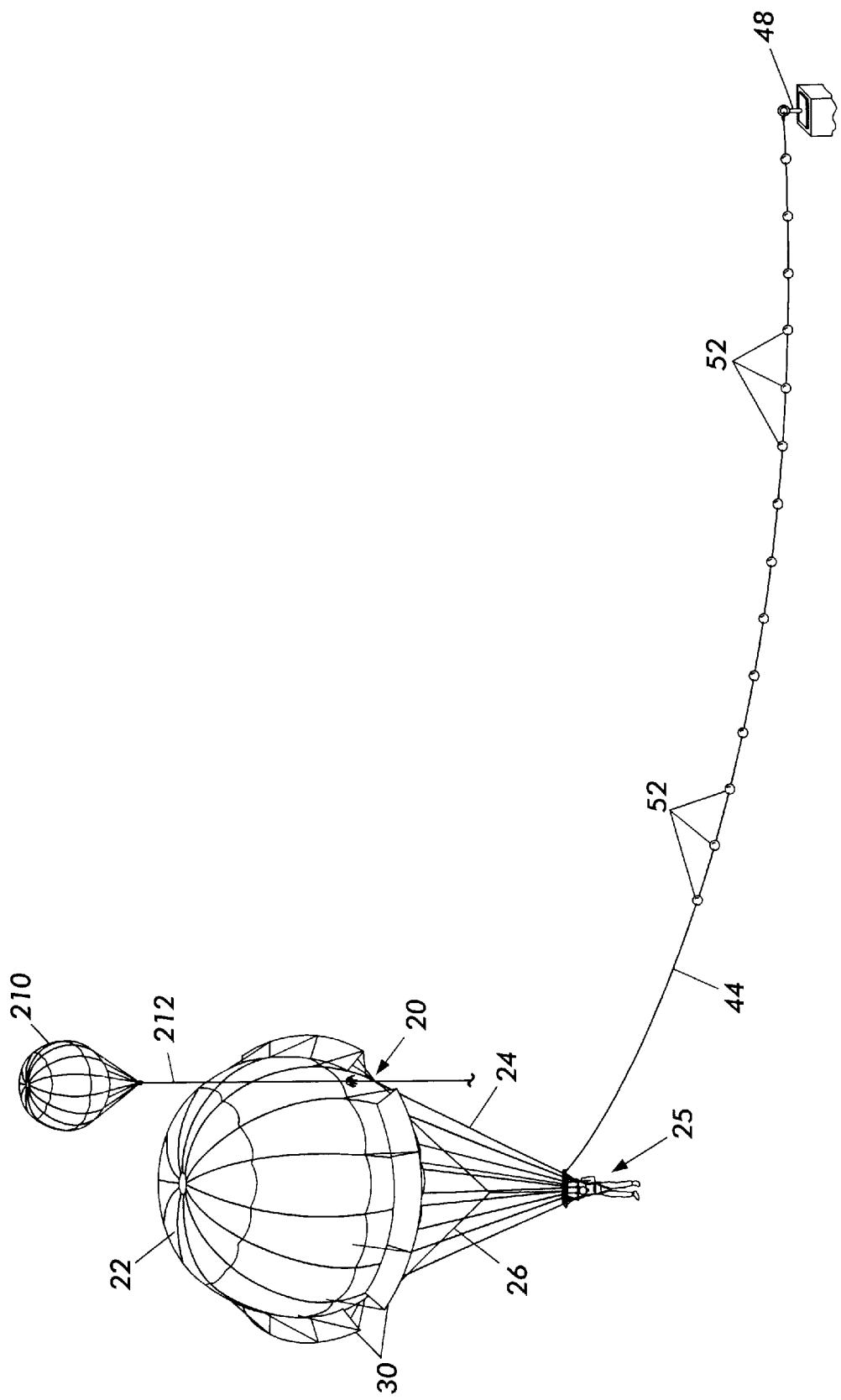
FIG. 2 illustrates a personnel lifting device in accordance with an alternative aspect of the present invention.

In the embodiments depicted in FIGS. 1 and 2, the user 25 and the balloon apparatus 20 are tethered to the ground using a plurality of "weighted" tethers 44 (e.g., ropes, cables) that may optionally be attached to ground anchors 48. Ground anchors 48 are preferably fixed mounts or higher-weight "anchors" with at least one having a predetermined length of line (rope, cable, etc.) attached thereto.

The weighted tethers 44 may be comprised of heavy-duty rope or cable such as hemp, nylon, polyethylene, polypropylene or other materials suitable for outdoor use. The tether material and size being selected, not for its load capacity, but rather based upon its weight per unit length (e.g., pounds/foot). As illustrated in FIG. 1, the weighted tether may have one or more portions 46 thereof made of the heavier material, allowing the extreme ends to be made from a lighter-weight tether material so as to enable initial lift of the balloon 22 and rider, and to avoid interference between the user and the heavier tether material.

Alternatively, the anchors 48 may also include manual or automatic winch-type devices that allow the tether to be extended or retracted so as to control the range of motion (vertical and/or horizontal) of the user and attached balloon. In addition to the limiting tethers, the harness and/or balloon may be linked, via an additional line or tether to an attendant on the ground, and in turn a ground anchor. Hence, the attendant may be able to control the maximum height of the balloon and rider.

In a preferred embodiment one or more of said tethers is a "weighted" tether so that as the balloon and rider ascend the net upward force of the combination continuously and automatically decreases as the weighted portion of the tether (46) is lifted off the ground. Hence, the net upward acceleration also decreases to zero and ultimately the upward velocity decreases to zero as well just before descent. In such an embodiment, it would be possible to configure the balloon to provide a slight net upward lift to the user, thereby avoiding or limiting a user's impact upon returning to the ground.

Preferably, the tether weighting is achieved by attaching one or more "heavy" ropes or cables as or to the tether lines. Thus there would be no risk of injury from contact with the tether. In the embodiment of FIG. 1, the system contemplates the Use of one or more of the following tether materials along region 46 of the tethers:

| Tether Material | Weight (lbs.)/100 ft. |
| --- | --- |
| ⅜ inch Sisal rope | 3.5 |
| ½ inch, 3-strand Nylon rope | 6.5 |
| ½ inch, 12-strand braided Polyester rope | 8.9 |
| ⅝ inch, 12-strand braided Nylon rope | 10.4 |

Preferably the tether is selected so that the weight of the suspended portion of the tether(s) increases by in relation to the desired elevation. In other words, the weight added would be increased faster for a user wishing to limit his/her ascent to 20–30 feet, whereas the weight added would be increased slower for a user wishing to achieve an ascent of 75–100 feet. Alternatively, it is also contemplated that a variably weighted tether region 46 may be implemented using tubing or hose that is permanently attached to at least a portion of tether 44, where the amount and type of material used to fill the tubing is adjusted to provide a desired limiting force to further ascent of the balloon.

Referring also to FIG. 2, In the alternative embodiment depicted therein, it may be possible to achieve the same result of a heavy tether by permanently affixing small weights 52 to the tethers in a spaced-apart fashion so that as the balloon and rider ascend, more and more of the small weights are lifted along with the tether. Thus, at some point, the added weight from the tether (heavy rope or weighted tether) causes the balloon to stop ascending and begin descending.

Referring again to FIGS. 1 and 2, it should also be noted that the balloon and rider may be assisted in the ascent by a secondary or lifting balloon 210 which may be engaged at the ground level and then disengaged when the rider has ascended to a desired elevation. In the embodiment depicted, the lifting system includes an associated personnel lifting device 20 as described above, and an auxiliary lifting balloon 210 filled with lighter-than-air gas, said auxiliary lifting balloon being temporarily coupled to lifting device 20, wherein the lift of the auxiliary lifting balloon in combination with the gravitational force adjustment system provides a net upward lifting force to the user. The height to which the user and the personnel lifting device are raised is a function of the length to which the tether is extended from the ground anchor and/or the weight of the tether.

After the system has been raised to a desired height, either by the auxiliary balloon or other means, the weighted tethers will also have been lifted from the ground and the balloon, user and tethers in combination, will have a net downward force. The auxiliary balloon is then released and the balloon 20 and rider 25 are allowed to free-fall. The ascent may simulate a parachute jump, with initially increasing acceleration, until the weighted tethers begin to contact the ground. Upon contact, the overall weight of the tethers begins to continually decrease, thereby slowing the descent (due not only to decreased weight on the balloon, but also from air drag on the balloon). Preferably, the rider will come into contact with the ground at a force no greater than that encountered when jumping from a slightly elevated platform.

Figure 3:
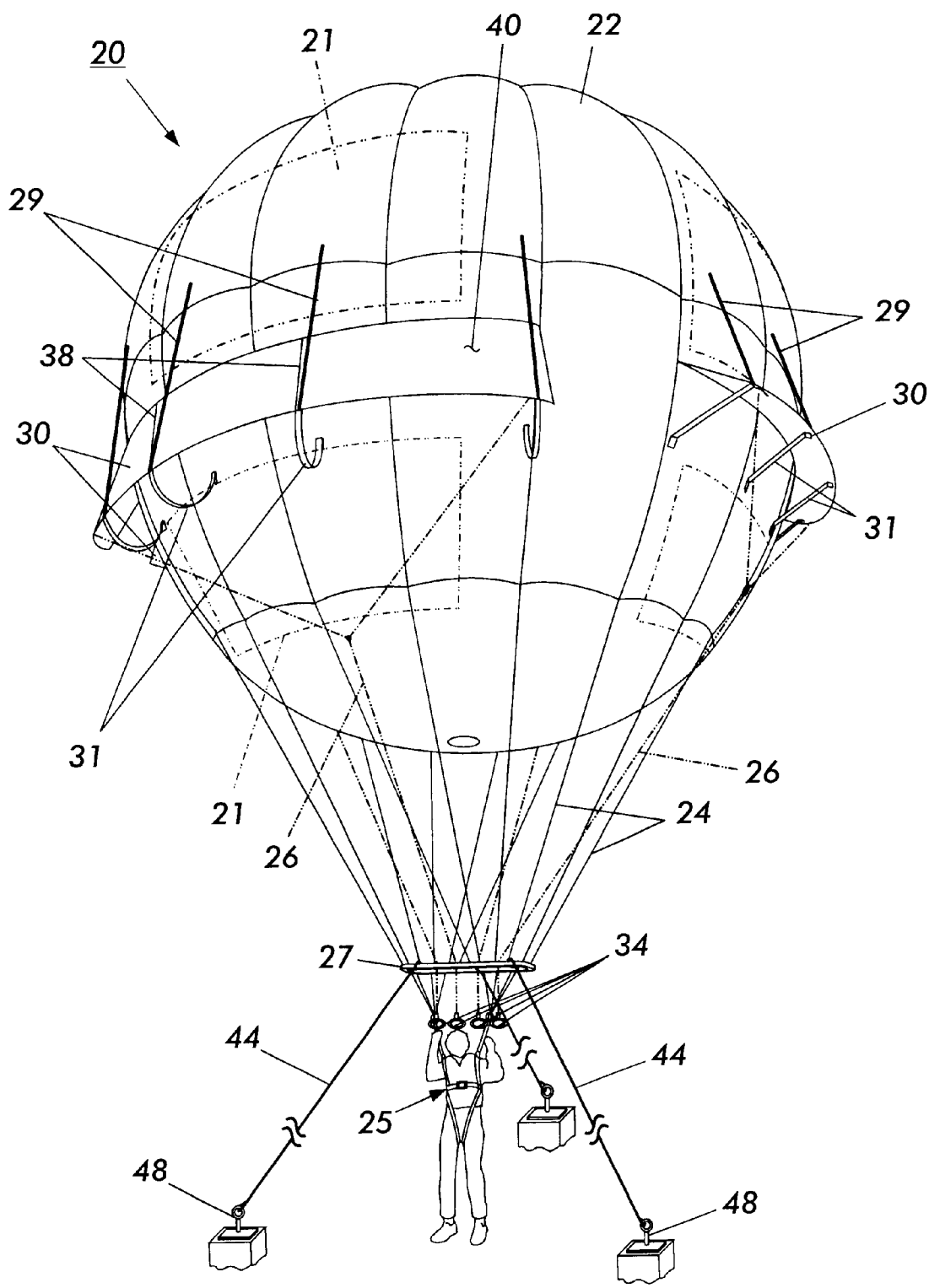
FIG. 3 is an orthographic view of a personnel lifting device in accordance with one aspect of the present invention.

Balloon 20 also preferably includes a plurality of paraflaps 30 extending outward from the balloon along a circumferential arc midway between the top and bottom of the balloon. As depicted in FIG. 3, at least three and preferably four paraflaps are included so as to provide left-right, front-back attitude adjustments to the user. As seen in FIG. 3, the attitude of the front and side paraflaps are adjustable by pulling on handles 34, each of which is connected to a respective paraflap by lines 26. Pulling on a handle draws the respective paraflap down toward the bottom of the balloon and reduces the drag caused by the paraflap when the balloon is descending. A user is, therefore, able to control the rate and direction of descent of the balloon by pulling on the handles 34.

Placement of the paraflaps is preferably around a horizontal hemispherical arc for the spherical balloon. However, other balloon shapes may be employed, including a cylinder; a regular polygon; and an ellipsoid. In each of these shapes, the location of the paraflaps is preferably about the balloon at a location that maximizes the total cross sectional area of the balloon and the paraflaps combined. Furthermore, the location is preferably at or above a center of gravity location for the balloon shape. For example, on a cylindrical balloon that is oriented with its longitudinal axis in a vertical direction, the paraflaps would preferably be placed above a midpoint of the longitudinal axis so as to provide stability for the balloon.

As illustrated in FIG. 3, the paraflaps 30 are comprised of a semi-rigid frame 38 made out of aluminum or plastic tubing (e.g., poly-vinyl chloride) over which is wrapped or stretched a continuous piece of tightly woven fabric 40 or equivalent that is both strong and light-weight and generally restricts the flow of air therethrough as in a parachute or kite (e.g., mylar, nylon, etc.). Because the frame maintains the paraflaps in a fully extended configuration, there is no requirement for any descent of the balloon in order to cause the paraflaps to billow before they can provide drag and affect the direction of the balloon. In a preferred embodiment, the paraflaps are maintained in an extended position (generally horizontal) by at least one elasticized upper tether line 29 and at least one fixed length lower tether line 31. Such an arrangement of elasticized and fixed length paraflap tethers maintains the paraflaps in a position to maximize their drag.

As depicted in FIG. 3, paraflaps 30 encircle the balloon along a continuous arc that is parallel with the horizon, the paraflaps covering approximately 75–100 percent of the arc. Furthermore, the paraflaps extend radially outward from the balloon 22 for a distance of approximately 2–30 percent of the radius of the balloon, and preferably 5–15 percent of the radius. It will be further appreciated that the paraflaps, meridian lines, and tether lines associated with the balloon are preferably fastened or attached to the balloon at reinforced points along the outermost layer of the balloon material so as to reduce the stress on the balloon fabric, and to prevent degradation and ultimate leakage of the light-than-air gas therefrom. It is possible, however, to use paraflaps of a different size and structure, and various alternatives are intended to be incorporated herein.

Referring again to FIG. 3, balloon 22 may also include removable display panels 21, that could be lighted, for the display of names or advertising. Such panels are preferably attached via hook-and-loop or snap fasteners so as to make replacement of the display easy.

Figure 4:
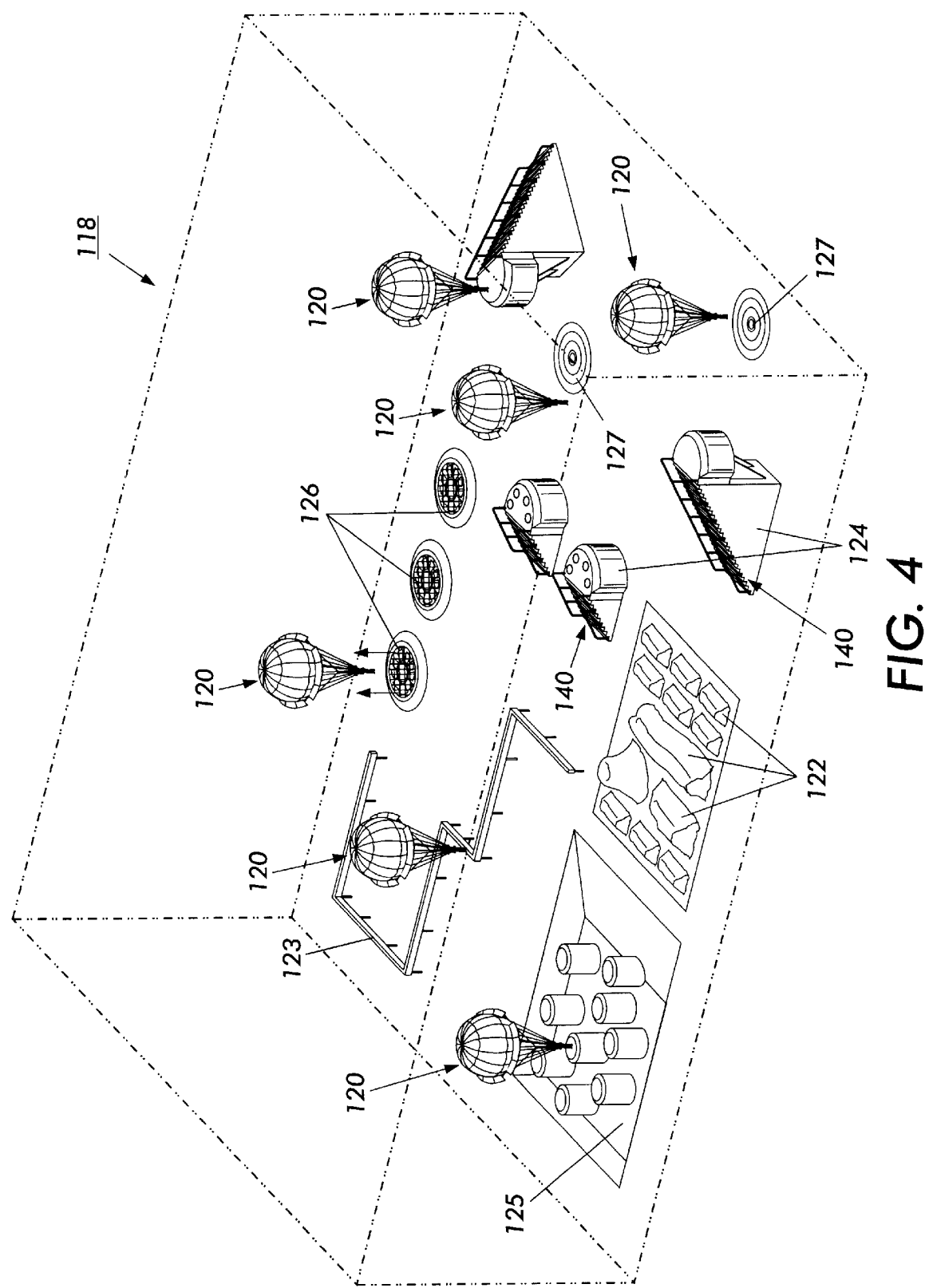
FIG. 4 is a perspective view of an amusement application for the personnel lifting disclosed herein.

Referring next to FIG. 4 there is shown a perspective view of an amusement application for the personnel lifting device. A particular application for the personnel lifting device is in a game-like setting wherein a user attached to the personnel lifting device tries to complete an obstacle course or tries to score a goal (not shown) while attached to the personnel lifting device. As depicted in the figure, obstacle course 118 is composed of a plurality of obstacles that must be navigated by a user while wearing the personnel lifting device (120). Obstacles include, but are not limited to, mounds or roughed terrain (e.g., bunkers) 122, elevated platforms 124 of varying heights, horizontal beams 123, trenches 125, and targets 127 to aim for when descending from above. Obstacles may also include fans 126 installed below the playing surface of the obstacle course or on the elevated platforms, wherein the fan directs airflow in a predetermined direction (e.g., upward), the airflow being sufficient to cause the user and the personnel lifting device to be moved. For example, when the airflow is directed upward or vertically, and the fan is activated as a user approaches in proximity of the fan, the user and personnel lifting device may be pushed off the playing surface and temporarily suspended above the surface.

As will be appreciated obstacles may further include a scoring object (e.g., a basketball, football, etc.) and a target may be employed and a goal scored by moving the scoring object to the target. For example, a basketball-like game could be played with an elevated hoop (not shown) to which the user must jump or bounce, under the assistance of the personnel lifting device, in order to shoot the ball therethrough. The amusement may also consist of a football-like setting, where one or more players on each team are attached to the personnel lifting device and try to advance the ball to the opposing teams goal area (e.g., end zone or similarly marked area. It will be further appreciated that while such games may be conducted with personnel lifting devices tethered in a fixed manner to the ground, it is preferred that the personnel lifting devices be constrained by the weighted tether mechanism described above, allowing the user increased freedom of motion.

Also depicted in FIG. 4 are exemplary elevated jumping platforms or towers 124 constructed in accordance with aspects of the present invention. In each tower, the user uses a set of steps 140 to walk or bound to the top of the platform before jumping off under the assistance of the personnel lifting device. Jumping towers 124 preferably range in heights from 10 feet to 50 feet, and may also include targets toward which a user attempts to jump and/or maneuver the personnel lifting device while descending. Each elevated jumping tower preferably includes means for preventing the abrading or tearing of the balloon and harness of the personnel lifting device as the user jumps from the tower. In one embodiment, the top platform of the towers include a bumper (not shown) about a periphery of the platform to prevent abrasion of the balloon once a user has jumped. As described above, the tower platform may also include one or more recessed fans, positioned to produce airflow that is directed upward and away from the platform. When a user steps to the edge, the balloon is blown up and out so as to direct it away from the edge of the platform.

In recapitulation, the present invention is an apparatus to partially counter normal gravitational force, and more particularly to various features of a balloon, wherein the balloon apparatus further includes weighted tethers to limit the ascent of the user attached to the balloon.

It is, therefore, apparent that there has been provided, in accordance with the present invention, a personnel lifting apparatus with an ascent limiting feature. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A personnel lifting device comprising:
    a sealed, inflatable balloon filled with a light-than-air gas;
    a harness attached thereto for suspending an individual below the balloon; and
    at least one weighted tether attached to said balloon, said weighted tether having at least a lower portion of the length thereof provided with additional weight distributed therealong, wherein the load of the weighted tether increases as a function of the elevation of the balloon up to a point where the entire weighted tether is lifted from the ground, and where a simulated free-fall results as the personnel lifting device is permitted to descend from an elevated position.

2. The personnel lifting device of claim 1, wherein the weighted tether is accomplished using a tether having a plurality of weights attached thereto at spaced intervals.

3. The personnel lifting device of claim 1, wherein the shape of said inflatable balloon is selected from the group of shapes consisting of:

a sphere;

a cylinder;

a regular polygon; and an ellipsoid.

4. The personnel lifting device of claim 1, wherein said inflatable balloon has a plurality of flaps permanently extending therefrom and operatively associated therewith, the attitude of at least one of said flaps being adjustable by the individual so as to permit the individual to control the direction of descent of the personnel a lifting device from an elevated position.

5. The personnel lifting device of claim 4, wherein said flaps are positioned partially about a continuous arc extending around a portion of said balloon.

6. The personnel lifting device of claim 1, wherein the weighted tether includes a tube attached along a length thereof, wherein the tube is at least partially filled with a heavier than air fluid.

7. The personnel lifting device of claim 1, wherein said weighted tether is anchored so as to limit the ascent of the personnel lift device.

8. A lifting system, including:

a personnel lifting device including a sealed, inflatable balloon filled with a lighter-than-air gas and a harness attached thereto for suspending the user below the balloon;

a weighted tether associated with the personnel lifting device; and an auxiliary lifting balloon filled with lighter-than-air gas, said auxiliary lifting balloon being temporarily coupled to the personnel lifting device, wherein the auxiliary lifting balloon in combination with the personnel lifting device provides a net upward lifting force to the user, and where the weighted tether attached to said balloon will automatically cause the personnel lifting device to return to the ground upon disengagement of the auxiliary lifting balloon, while automatically decreasing the ballast of the personnel lifting device during descent in order to cause the descent to decelerate as the user approaches the ground.

9. A method for simulating free-fall descent, including:

attaching oneself to a personnel lifting device, wherein the personnel lifting device includes a sealed, inflatable balloon filled with a lighter-than-air gas and a harness attached thereto for suspending oneself below the balloon;

attaching a weighted tether to the personnel lifting device, said weighted tether having additional weight distributed along at least a lower portion of the length thereof;

applying an upward force to the personnel lifting device so as to elevate oneself above the ground;

removing the upward force; and allowing the personnel lifting device to descend, whereby the downward force applied by the weighted tether is reduced as the personnel lifting device descends and the lower portion of the weighted tether comes into contact with the ground, thereby resulting in a simulated free-fall upon descent of the personnel lifting device from an elevated position.

10. The method of claim 9, wherein the step of applying an upward force to the personnel lifting devices includes temporarily coupling an auxiliary lifting balloon filled with lighter-than-air gas to the personnel lifting device, wherein the auxiliary lifting balloon in combination with the personnel lifting device provides a net upward lifting force.

11. The method of claim 9, wherein the step of applying an upward force to the personnel lifting devices includes climbing, while attached to the personnel lifting device, up a plurality of steps to an elevated position.

12. The method of claim 11, further comprising the step of jumping, while attached to the personnel lifting device, from the elevated position.

13. The method of claim 12, wherein the personnel lifting device further includes paraflaps for maneuvering the device during descent from the elevated position, and further comprising the steps of maneuvering oneself so as to attempt to land on a target as part of an amusement.

14. The personnel lifting device of claim 1, wherein the weighted tether comprises:

a first section of rope having a first weight per unit length, said first section being attached at the balloon; and a second section of rope having a second weight per unit length wherein the second weight per unit length is greater than the first weight per unit length.

15. A personal lifting device comprising:

a sealed inflatable balloon filled with lighter-than air gas;

a harness attached thereto for suspending an individual rider below the balloon, wherein the net force on the balloon and rider combined is not downward before any weights are added by a tether or other means;

means for raising said balloon to an elevated position;

at least one tether attached to said balloon, said tether including a first portion and at least a second portion, wherein the first portion is attached to the balloon and does not include any weights and where the second portion is weighted, such that the net force on the balloon and rider is downward when the first portion and the second portion of said tether are raised off the ground; and means for releasing the balloon and rider from the elevated position such that when the weighted second portion of the tether is raised off the ground, a simulated free-fall results until the balloon and rider have descended to a level where the weighted second portion is again in contact with the ground and the net downward force on the rider is decreased, allowing for a soft landing.

* * * * *